US011630806B1

(12) United States Patent
Timmons

(10) Patent No.: US 11,630,806 B1
(45) Date of Patent: *Apr. 18, 2023

(54) METHOD, APPARATUS, AND COMPUTER PROGRAM PRODUCT FOR COMPRESSION OF A GRAPH

(71) Applicant: Liberty Mutual Insurance Company, Boston, MA (US)

(72) Inventor: Justin Timmons, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/302,157

(22) Filed: Apr. 26, 2021

Related U.S. Application Data

(63) Continuation of application No. 16/211,441, filed on Dec. 6, 2018, now Pat. No. 11,023,421.

(60) Provisional application No. 62/596,014, filed on Dec. 7, 2017.

(51) Int. Cl.
| | |
|---|---|
| G06F 16/21 | (2019.01) |
| G06F 16/174 | (2019.01) |
| H04L 45/12 | (2022.01) |
| G06F 16/901 | (2019.01) |
| G06F 16/215 | (2019.01) |
| G01C 21/26 | (2006.01) |

(52) U.S. Cl.
CPC ........ *G06F 16/1744* (2019.01); *G06F 16/215* (2019.01); *G06F 16/9024* (2019.01); *H04L 45/12* (2013.01); *G01C 21/26* (2013.01)

(58) Field of Classification Search
CPC . G06F 16/1744; G06F 16/215; G06F 16/9024
See application file for complete search history.

(56) References Cited

U.S. PATENT DOCUMENTS

| | | | | |
|---|---|---|---|---|
| 6,920,477 | B2* | 7/2005 | Mitzenmacher | H04L 67/288 |
| | | | | 709/216 |
| 7,089,252 | B2* | 8/2006 | Tomlin | G06F 17/12 |
| 7,818,303 | B2* | 10/2010 | Buehrer | G06F 16/95 |
| | | | | 707/693 |
| 2004/0210826 | A1* | 10/2004 | Najork | G06F 16/958 |
| | | | | 715/255 |
| 2006/0026191 | A1* | 2/2006 | McSherry | G06F 16/289 |
| | | | | 707/999.102 |
| 2007/0168981 | A1 | 7/2007 | Pacheco et al. | |
| 2007/0220064 | A1* | 9/2007 | Najork | G06F 11/2035 |
| 2007/0234297 | A1 | 10/2007 | Zorn et al. | |
| 2009/0313596 | A1 | 12/2009 | Lippmann et al. | |

(Continued)

OTHER PUBLICATIONS

Gilbert et al., Compressing Network Graphs, [online], 11 pages, Dec. 8, 2011, [retrieved Apr. 19, 2019], [retrieved Apr. 19, 2019], retrieved from the Internet <URL: https://cseweb.ucse.edu/~klevchen/gl-linkkdd04.pdf>.

(Continued)

*Primary Examiner* — Eliyah S. Harper
(74) *Attorney, Agent, or Firm* — Alston & Bird LLP

(57) ABSTRACT

With graph compression, there is a need to significantly reduce the size of the graph information/data for routing determinations. The disclosed graph compression allow for more efficient and less resource-intensive routing determinations while maintain complete graph fidelity.

18 Claims, 6 Drawing Sheets

(56) References Cited

U.S. PATENT DOCUMENTS

| | | | | |
|---|---|---|---|---|
| 2010/0306158 | A1* | 12/2010 | Andersen | G06F 17/10 708/401 |
| 2013/0222388 | A1 | 8/2013 | McDonald | |
| 2013/0261968 | A1 | 10/2013 | Sakairi et al. | |
| 2013/0268565 | A1* | 10/2013 | Stergiou | G06F 16/9024 707/E17.011 |

OTHER PUBLICATIONS

Khalili et al., Web-Graph Pre-Compression for Similarity Based Algorithms, Proceedings of the Third International Conference on Modeling, Simulation and Applied Optimization, Sharjah, U.A.E, University of Wollongong, Research Online, Jan. 22, 2009, 7 pages, [retrieved Apr. 19, 2019], [retrieved Apr. 19, 2019], retrieved from the Internet <URL: https://ro.uow.edu.au/dubaipapers/55/>.

Navlakha et al., Graph Summarization With Bounded Error, Proceedings of the 2008 ACM SIGMOD International Conference on Management of Data, pp. 419-432, Jun. 12, 2008.

Shi et al., Scalable Network Traffic Visualization Using Compressed Graphs, 2013 IEEE International Conference on Big Data, Oct. 9, 2013, pp. 606-612.

Toivonen et al., Compression of Weighted Graphs, Proceedings of the 17th ACM SIGKDD International Conference on Knowledge Discovery and Data Mining, pp. 965-973, Aug. 24, 2011.

Toivonen et al., Network Compression by Node and Edge Mergers, In: Berthold M.R. (eds) Bisociative Knowledge Discovery. Lecture Notes in Computer Science, vol. 7250, Springer, Berlin, Heidelberg, (2012), pp. 199-217), [retrieved Apr. 19, 2019], [retrieved Apr. 19, 2019], retrieved from the Internet <URL https://doi.org/10.1007/978-3-642-31830-6_14>.

Yang et al., Routing Optimization Algorithms Based on Node Compression in Big Data Environment, Hindawi Scientific Programming, vol. 2017, 8 pages, [retrieved Apr. 19, 2019], [retrieved Apr. 19, 2019], retrieved from the Internet <URL: https://www.hindawi.com/journals/sp/2017/2056501/>.

U.S. Appl. No. 16/211,441, filed Dec. 6, 2018.

U.S. Appl. No. 62/596,014, filed Dec. 7, 2017.

* cited by examiner

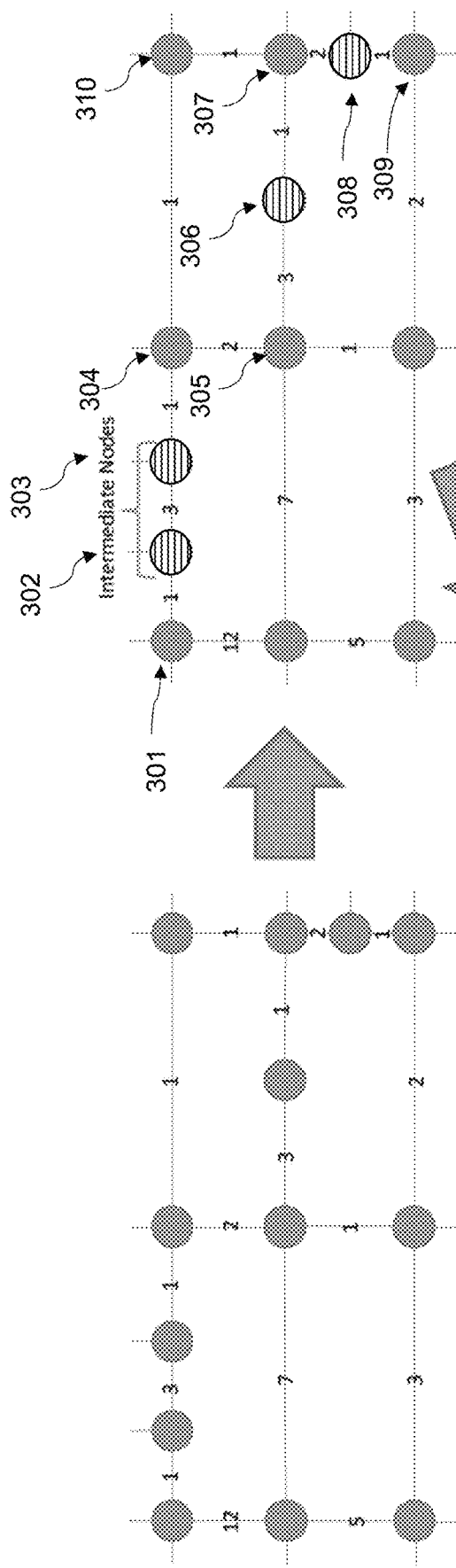
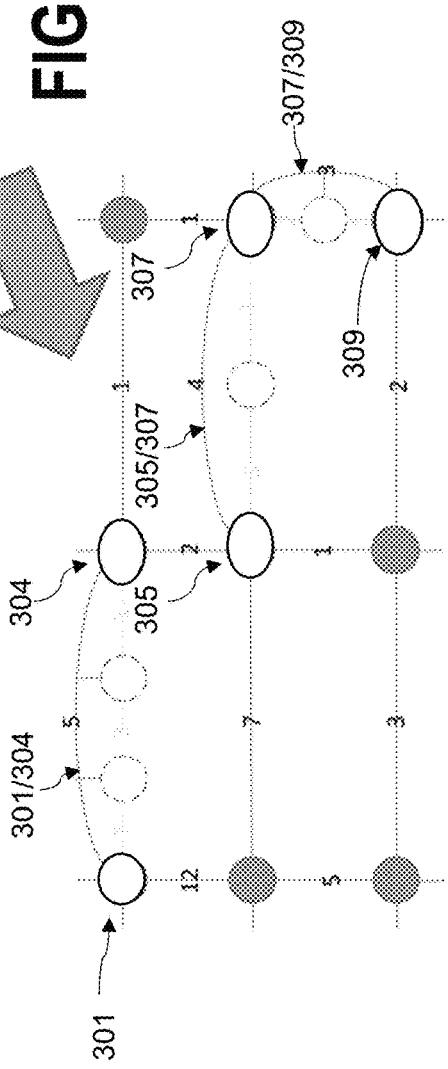
FIG. 3A
FIG. 3B
FIG. 3C

METHOD, APPARATUS, AND COMPUTER PROGRAM PRODUCT FOR COMPRESSION OF A GRAPH

CROSS-REFERENCE TO RELATED APPLICATIONS

This application is a continuation of U.S. application Ser. No. 16/211,441 filed Dec. 6, 2018, which claims priority to U.S. Provisional Application No. 62/596,014 filed Dec. 7, 2017, which are hereby incorporated herein in their entireties by reference.

BACKGROUND

Graphs are used to represent massive collections of large network datasets ranging from social networks, web graphs, road networks, internet networks, citation networks, collaboration networks, communication networks, and the like. These large network datasets may have millions or even billions of nodes and edges. As such, the size of these datasets presents resource-intensive computational search space and presents significant obstacles in routing, for example, to and from various nodes.

Applicant has identified a number of deficiencies and problems associated with conventional compression techniques. Through applied effort, ingenuity, and innovation, many of these identified problems have been solved by developing solutions that are included in embodiments of the present invention, some examples of which are described in detail herein.

BRIEF SUMMARY

In general, embodiments of the present invention provide methods, apparatus, systems, computing devices, computing entities, and/or the like for graph compression and routing.

In accordance with one aspect, a method is provided. In one embodiment, the method comprises accessing the graph for compression, the graph comprising a node set comprising a plurality of nodes and an edge set comprising a plurality of edges, each edge of the comprising a weighting value; identifying a first intermediate node from the node set; programmatically searching outwardly from the first intermediate node to identify a first decision node in a first direction and a second decision node in a second direction; generating a new edge from the first decision node to the second decision node, wherein the new edge bypasses at least the first intermediate node; assigning a weighting value to the new edge; and store the graph as a compressed graph.

In accordance with another aspect, a computer program product is provided. The computer program product may comprise at least one computer-readable storage medium having computer-readable program code portions stored therein, the computer-readable program code portions comprising executable portions configured to access the graph for compression, the graph comprising a node set comprising a plurality of nodes and an edge set comprising a plurality of edges, each edge of the comprising a weighting value; identify a first intermediate node from the node set; programmatically search outwardly from the first intermediate node to identify a first decision node in a first direction and a second decision node in a second direction; generate a new edge from the first decision node to the second decision node, wherein the new edge bypasses at least the first intermediate node; assign a weighting value to the new edge; and store the graph as a compressed graph.

In accordance with yet another aspect, an apparatus comprising at least one processor and at least one memory including computer program code is provided. In one embodiment, the at least one memory and the computer program code may be configured to, with the processor, cause the apparatus to access the graph for compression, the graph comprising a node set comprising a plurality of nodes and an edge set comprising a plurality of edges, each edge of the comprising a weighting value; identify a first intermediate node from the node set; programmatically search outwardly from the first intermediate node to identify a first decision node in a first direction and a second decision node in a second direction; generate a new edge from the first decision node to the second decision node, wherein the new edge bypasses at least the first intermediate node; assign a weighting value to the new edge; and store the graph as a compressed graph.

BRIEF DESCRIPTION OF THE DRAWINGS

Figure 1:
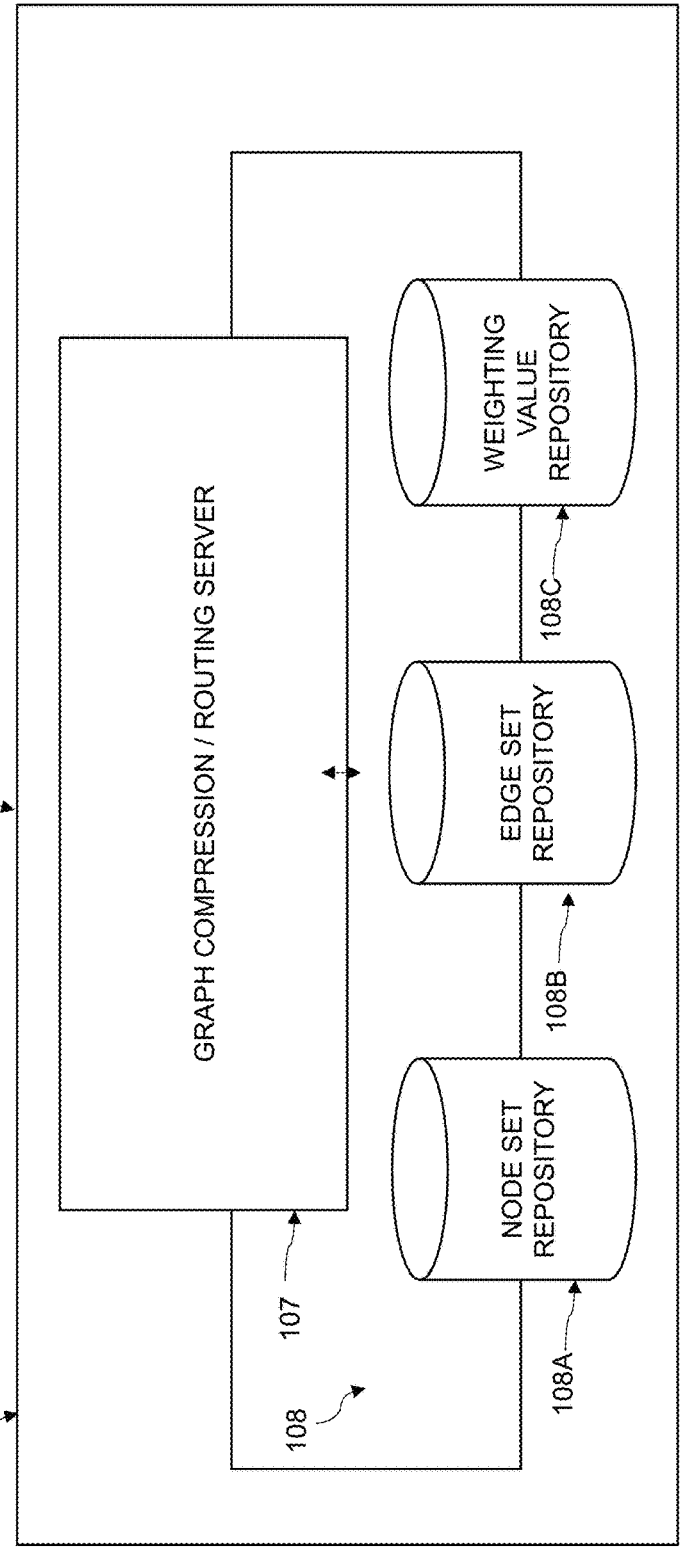
Figure 2:
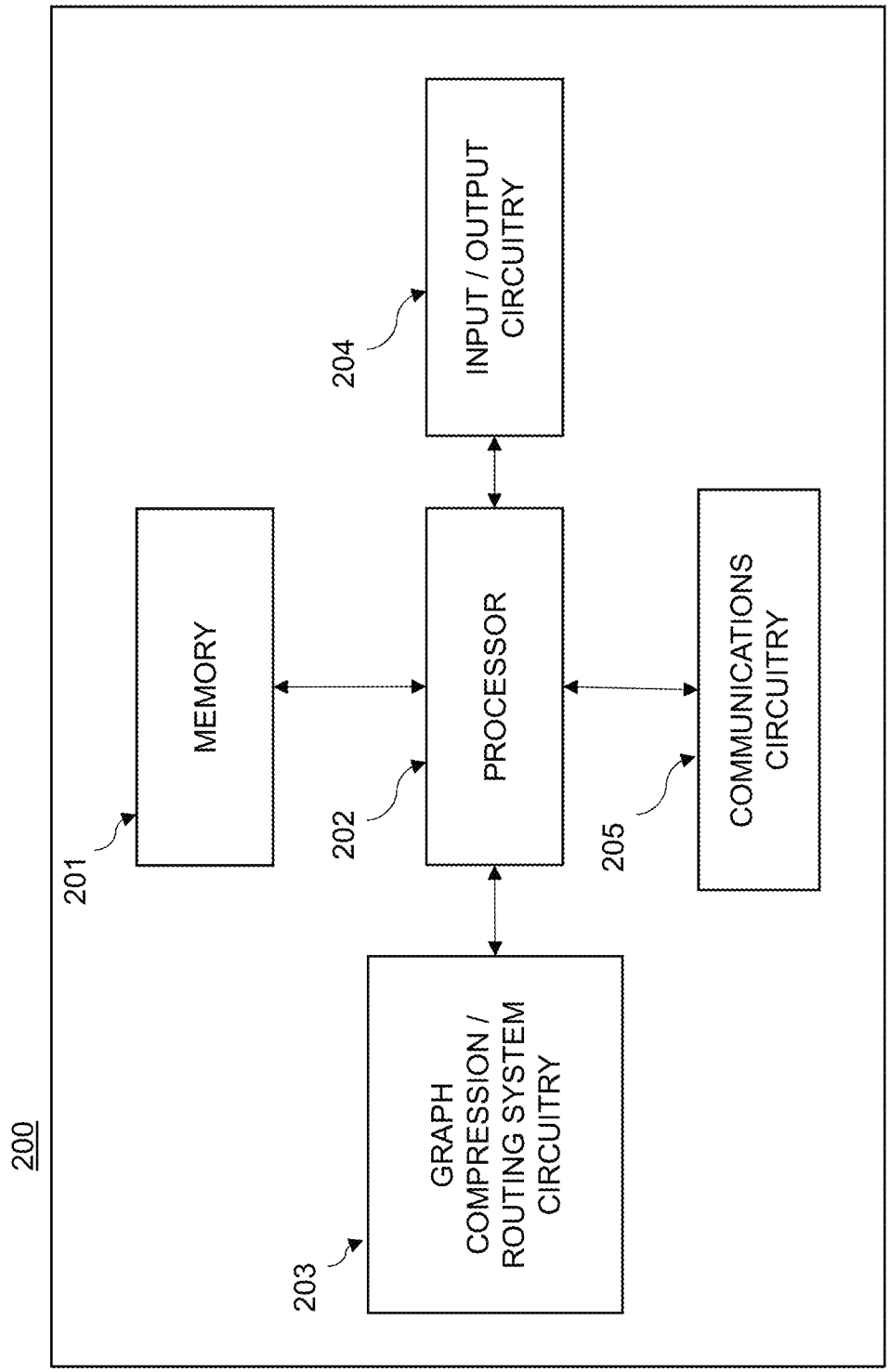
Figure 4:
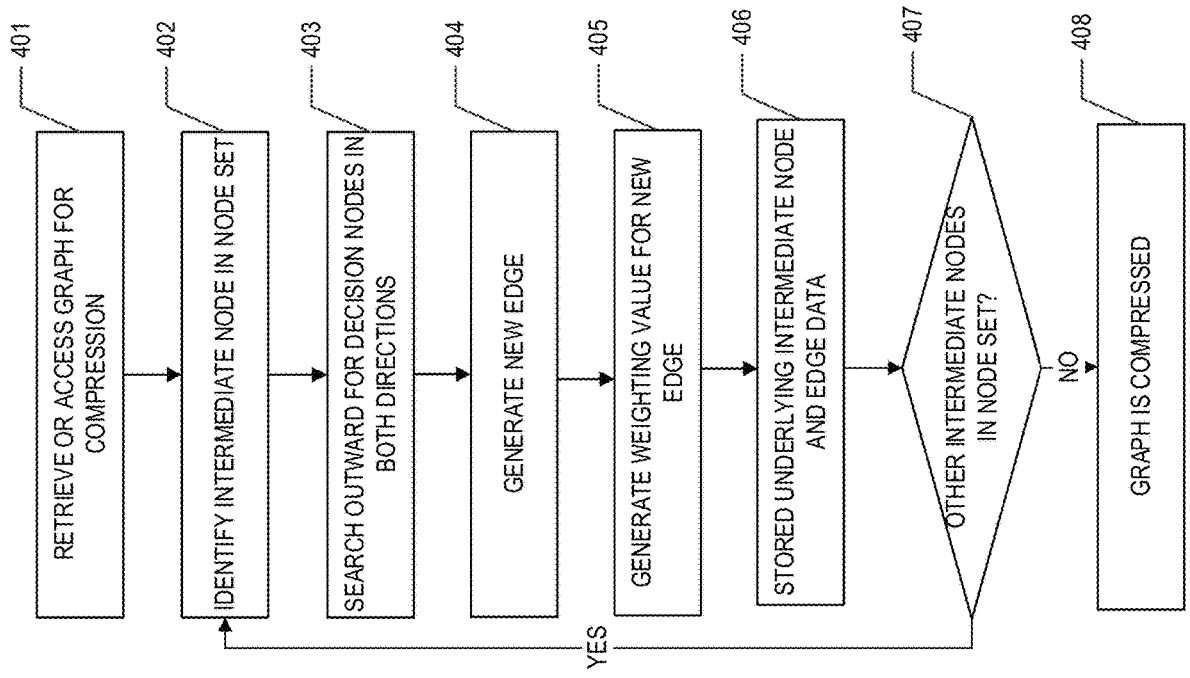
Figure 5:
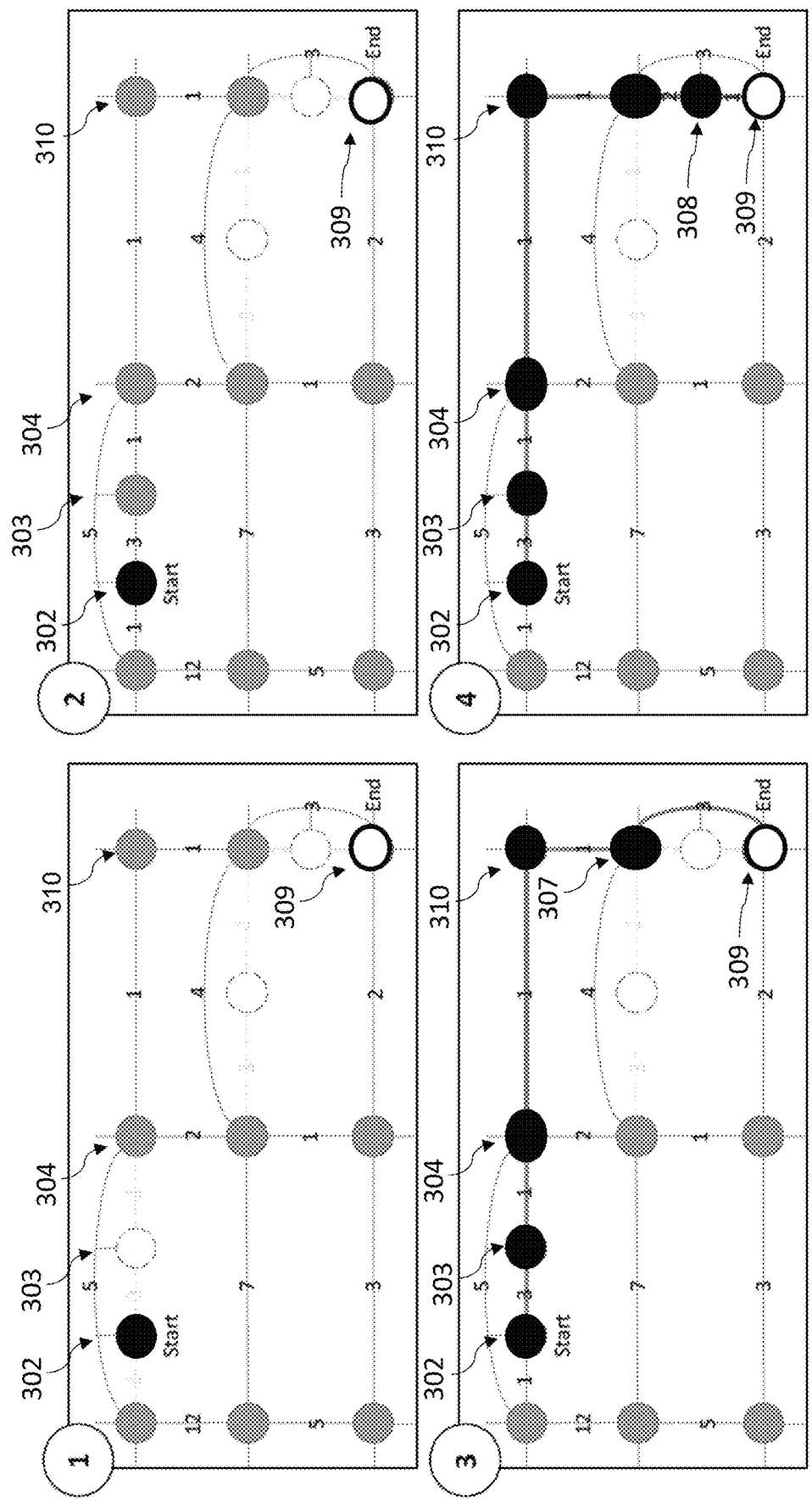
Figure 6:
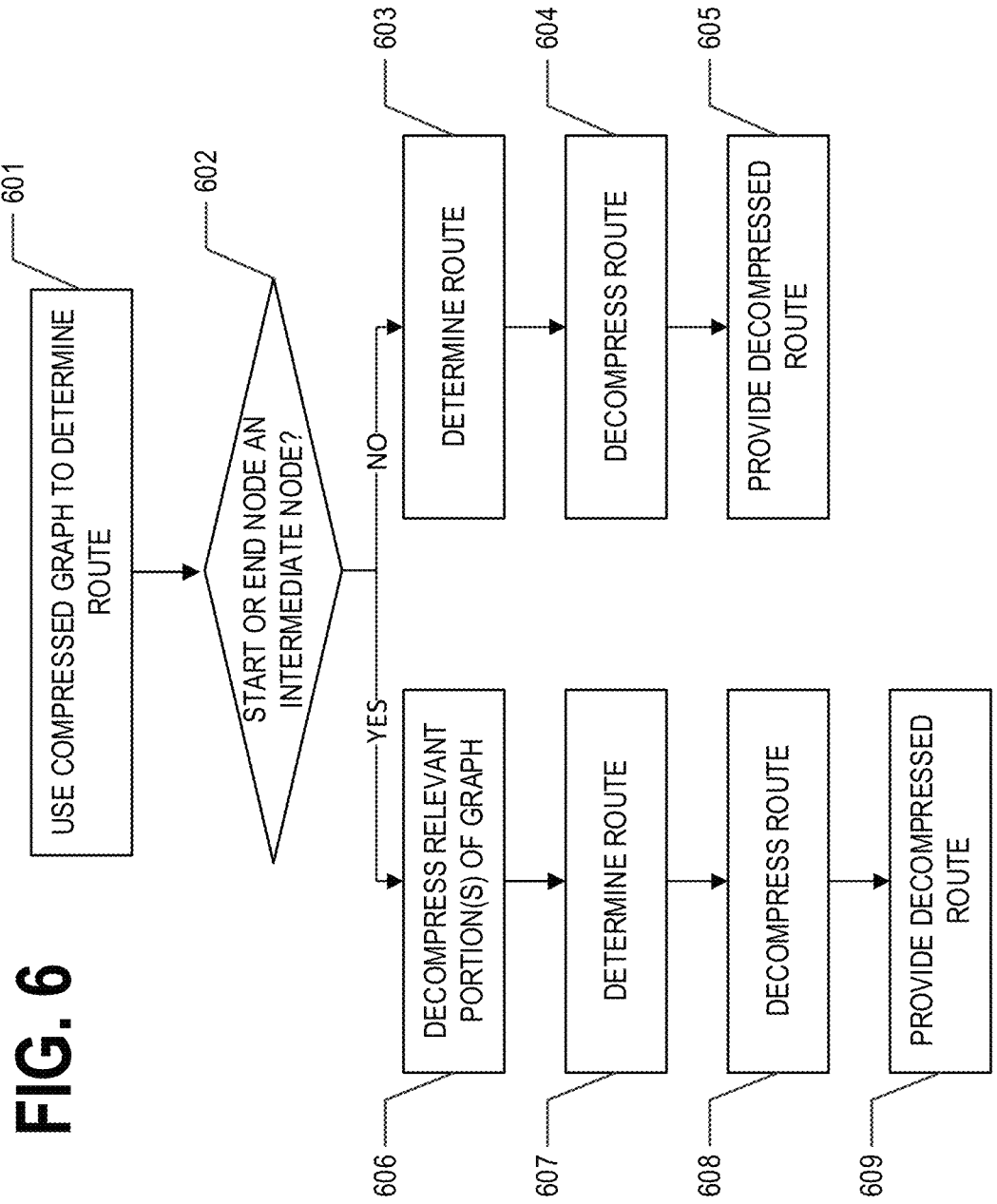

Having thus described the invention in general terms, reference will now be made to the accompanying drawings, which are not necessarily drawn to scale, and wherein:

FIG. 1 is a system architecture diagram of system configured to practice embodiments of the present invention;

FIG. 2 is an exemplary schematic diagram of a computing entity according to one embodiment of the present invention;

FIGS. 3A, 3B, and 3C include an exemplary graph for compression, consistent with certain embodiments of the present disclosure;

FIG. 4 is a flow chart of an exemplary process for compression of a graph for use with embodiments of the present disclosure;

FIG. 5 includes an exemplary graph and process for decompression, consistent with certain embodiments of the present disclosure; and FIG. 6 is a flow chart of an exemplary process for decompression of a graph for use with embodiments of the present disclosure.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Overview

Various embodiments of the invention generally relate to graph compression and routing techniques that supports compression of a graph for determining a compressed route and decompression of the graph or route for providing the full route to maintain graph and route fidelity. Embodiments of the present invention may be particularly useful in graphs with high linearity or graphs with portions of high linearity.

As will be recognized, the disclosed concepts can be used to compress and decompress any type of graph and/or network dataset and are not limited to a particular context.

A. Exemplary Definitions

As used herein, the terms "data," "content," "information," and similar terms may be used interchangeably to refer to information/data capable of being transmitted, received, and/or stored in accordance with embodiments of the present invention. Thus, use of any such terms should not be taken to limit the spirit and scope of embodiments of the present invention. Further, where a computing device is described herein to receive information/data from another computing device, it will be appreciated that the information/data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send information/data to another computing device, it will be appreciated that the information/data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "graph" refers to a structure representing connections or interrelations among two or more objects indicating their relationships within a network. In embodiments, a graph may comprise nodes representing objects (e.g., locations) and edges representing relationships between those objects. Each edge may connect two or more nodes indicating an adjacent relationship between the nodes. In embodiments, a graph may represent a road network. The road network may comprise nodes representing points with within the road network. Thus, a node may represent any identifiable location, such as one or more addresses, sidewalks, highways, trails, alleys, paths, walkways, streets, street segments, entrance or exit ramps, roads, longitude and latitude points, geographic areas, landmarks, buildings, bridges, and/or other identifiable locations. And edges may represent connections between the nodes within the road network.

The term "node set" refers to one or more objects within a network. In embodiments, a node set may be depicted in a diagrammatic form as a set of dots or circles, where each dot or circle may be related to each other within the network.

The term "edge set" refers to relationships between two nodes of a node set (defined above) within a network. In embodiments, an edge set may be depicted in a diagrammatic form as a set of lines or curves, where each line or curve may be connected to two nodes of a node set indicating a relationship between the two nodes. In embodiments, an edge connecting two nodes may indicate that the two nodes are adjacent to each other.

The term "decision node" refers to a node at which a decision on which path to take within the graph is made. For example, in the road network embodiments, a decision node may be an intersection involving a crossing over two roads.

The term "intermediate node" refers to a node that is connected to exactly two adjacent nodes by two edges within a graph. For example, in the road network embodiments, an intermediate node may be a point of curvature along a road with no entrance or exit. In such embodiments, the intermediate node may be connected to exactly two edges representing two directions the intermediate node may lead. In such embodiments, no decision needs to be made since traversing to the next node can only proceed in either direction.

The term "graph" refers to a graph (defined above) comprising decision nodes and intermediate nodes (defined above).

The term "weighting value" refers to a value associated with an edge within a graph. In embodiments, the weighting value may represent a cost associated with the edge connecting two nodes. In the road network embodiments, the weighting value may represent the cost for traveling to and from nodes.

The term "routing algorithm" refers to a set of steps/operations or instructions used to determine the best route from a start node (defined below) to an end node (defined below) in a graph. In embodiments, the best route or best path may be determined based on minimizing a total cost associated with the edges selected for a route, where the total cost may be calculated based on aggregating (or other calculations) all of the weighting values associated with those selected edges. In the road network embodiments, the best route may be determined based on minimizing a total distance for a selected route.

The term "start node" refers to a node representing a start point of a path to an end node.

The term "end node" refers to a node representing an end point of a path from a start node.

The term "compressed route" refers to a route determined based on a compressed graph using a routing algorithm, where the compressed graph is generated according to embodiments of the present disclosure.

The term "decompressed route" refers to a route provided based on a decompressed graph.

The terms "linearity," "linear sequence," and/or similar words refer to one more intermediate nodes in a sequence with no intervening decision nodes.

B. Technical Problem

In the routing context, compressing information/data is used to save storage capacity and speed up routing determinations. In particular, because graphs are used to represent massive collections of large network datasets ranging from social networks, web graphs, road networks, internet networks, citation networks, collaboration networks, communication networks, and the like, these large network datasets may have millions or even billions of nodes and edges. As such, the size of these datasets presents resource-intensive computational search space and presents significant obstacles in routing, for example, to and from various nodes in a graph.

C. Technical Solution

Accordingly, various embodiments of the present invention provide compression and decompression steps/operations where all the graph information/data is recovered when a given compressed map is decompressed back to its original form.

Moreover, routing along a large-scaled graph is extremely expensive considering the network resources and time used for a routing algorithm computation. Graph compression may save some network resources and time for a routing algorithm computation. To that end, embodiments of the present invention reduce resources required to store graphs and route to and from nodes within graphs, while maintaining the fidelity of the graphs.

The methods, apparatus and computer program products described herein are operable to compress a graph for routing. In this regard, when constructing a route through a linear portion of a graph, there is no option for different paths to explore. In other words, the frontier (e.g., visited nodes) may expand only along the unexplored edge of the node currently being processed which may be the next node in the graph. Because of this, the frontier expansion considers many intermediate nodes which are not meaningful to the routing. Furthermore, when using routing algorithms on such large-scale graphs, with high cost-per-node-processing, it can be extremely expensive (e.g., resource intensive) to consider each intermediate nodes.

In that regard, graph compression is based on determining whether a node is a decision node (e.g., a node at which a decision on which path to take within the graph is made) or an intermediate node connecting two or more nodes through edges or an intermediate node (e.g., a node that is connected to exactly two adjacent nodes by two edges within a graph) that, creating new edges that compress linear sequences or chains of intermediate nodes, and assigning new weighting values to those new edges. The compressed graph may be used to determine a compressed route according to a routing algorithm associated with the initial weighting values and new weighting values, where the compressed route may include a start node representing a start point of the compressed route and an end node representing an end point of the compressed route.

The methods, apparatus and computer program products described herein are further operable to decompress the compressed route. The graph decompression starts with determining whether a start node or an end node is an intermediate node. If either the start node or the end node is determined to be an intermediate node, the methods, apparatus and computer program products described herein are operable to determine the route based on a compressed portion of the graph and a decompressed portion of the graph. If neither the start node nor the end node is determined to be an intermediate node, the methods, apparatus and computer program products described herein are operable to determine a route based on the compressed graph.

II. Exemplary System Architecture

FIG. 1 illustrates an example computing system within which embodiments of the present invention may operate. Client devices 101A-101N may access a graph compression and routing system 115 via a communications network 102 (e.g., the Internet, LAN, WAN, or the like) using client devices 101A-101N. The graph compression and routing system 115 may comprise a server 107 in communication with one or more databases 108 comprising one or more auxiliary information/data structures or repositories 108A, 108B, 108C. The server 107 may be embodied as a computer or computers as known in the art. The server 107 may provide for receiving of electronic information/data from various sources, including but not necessarily limited to the client devices 101A-101N. For example, the server 107 may be operable to receive and process routing requests provided by the client devices 101A-101N. The server 107 may facilitate the generation and providing of various routing. The server 107 may include a decision node/intermediate node determination module for determining whether a node is a decision node or intermediate node, an edge generator for generating new edges for compression of a graph, and a weighting value generator for generating new weighting values associated with the new edges.

The graph database 108 and repositories 108A-108C may be embodied as an information/data storage device such as a Network Attached Storage (NAS) device or devices, or as a separate database server or servers. The graph database 108 includes information/data accessed and stored by the server 107 to facilitate the operations of the graph compression and routing system 115. For example, the graph database 108 may include, without limitation, node set information, edge set information, weighting values, and/or the like.

Graph database 108 may include a variety of graph information/data to model one or more road networks, social networks, telecommunications networks, web networks, citation networks, collaboration networks, internet networks, temporal networks, online communities, and so on. In certain embodiments, the graph database 108 may include one or more repositories (illustrated in FIG. 1 as repositories 108A, 108B, and 108C).

Node set repository 108A may include a node set comprising information/data of all nodes within the graph compression and routing system 115.

Edge set repository 108B may include an edge set comprising information/data of all edges and their relationship with the nodes of the node set within the graph compression and routing system 115.

Weighting value repository 108C may include a plurality of weighting values, where each weighting value is associated with a respective edge within the edge set.

The client devices 101A-101N may be any computing device as defined above. Electronic information/data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute one or more "apps" to interact with the graph compression and routing system 115. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the graph compression and routing system 115 via a web browser. As yet another example, the client device 101A-101N may include various hardware or firmware designed to interface with the graph compression and routing system 115.

Via an interaction method described above, the client device 101A-101N may send a routing query to the graph compression and routing system 115.

An example of an information/data flow for exchanging electronic information/data among one or more client devices 101A-101N and the graph compression and routing system 115 is described below.

In the depicted embodiment, the one or more client devices 101A-101N are configured to transmit digital image files and other information/data to the graph compression and routing system 115. The digital image files and other information/data are transmitted by wired or wireless communication over the communications network 102 to the graph compression and routing system 115. The one or more client devices 101A-101N may receive communication over the communications network 102 from the compression graph system, and the communication may be transmitted by wired or wireless communication.

A. Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, and graph compression and routing circuitry 203. The apparatus 200 may be configured to execute the operations described above with respect to FIG. 1 and below with respect to FIGS. 3-6. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus should therefore be understood to include particular hardware configured to perform the functions associated with the particular circuitry as described herein. That is, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information/data among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit information/data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The graph compression and routing circuity 203 includes hardware configured to compress a graph and determine a best route based on the compressed graph. In some implementations, the graph compression is accomplished based on determining a node is a decision node or an intermediate node, generating new edges, and determining new weighting values associated with those new edges. The graph compression and routing circuitry 203 may utilize processing circuitry, such as the processor 202, to perform these actions. It should also be appreciated that, in some embodiments, the graph compression and routing circuitry 203 may include a separate processor, specially configured field programmable gate array (FPGA), or application specific interface circuit (ASIC).

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information/data presented by the example displays discussed herein can be based on information/data that is received, generated and/or maintained by one or more components of apparatus 200. In some embodiments, one or more external systems (such as a remote cloud computing and/or information/data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

III. Exemplary System Operations

The operation of various embodiments of the present invention will now be described. storage

A. Representations of Road Network Structure

The subsequent operation of various embodiments of the present invention is provided through an example embodiment of a road network. In this manner, compression and routing system 115 may be configured to employ information/data representations of points as nodes and paths as edges. The nodes denote, for example, one or more addresses, sidewalks, highways, trails, alleys, paths, walkways, streets, street segments, entrance or exit ramps, roads, longitude and latitude points, geographic areas, landmarks, buildings, bridges, and/or other identifiable locations within the road network—they also may represent one or more points along the same. The edges denote, for example, roads or pathways connecting nodes within the road network. FIGS. 3A, 3B, 3C, and 5 show diagrammatic representations of a road network represented by the same network information/data represented by a graph undergoing compression and decompression operations, respectively. In one aspect, the relationship between some of the nodes and edges is linear as depicted in FIGS. 3A, 3B, 3C, and 5. In FIGS. 3A, 3B, 3C, and 5, the nodes are represented as circles, the edges are represented as lines, and the numbers over the lines are the respective weighting values for the edges.

To reduce search space and for efficient routing determinations to and from nodes, it may be desirable to compress large scale graphs. For example, the compression/decompression and routing system 115 may be configured to compress the graph by generating new edges (comprising new weighting values) to bypass intermediate nodes.

B. Exemplary Compression Process

FIGS. 3A, 3B, and 3C illustrate exemplary graphs and general depictions of the compression processes. FIG. 4 illustrates an example flow chart representation of a routing algorithm providing various operations, steps and processes for graph compression of a graph for use with embodiments of the present disclosure. In this regard, the example routing algorithm discussed herein can be performed by the compression/decompression and routing system 115. As indicated at step/operation 401 of FIG. 4, the compression/decompression and routing system 115 may begin by retrieving or accessing a graph for compression. For example, the compression/decompression and routing system 115 may be configured to automatically request and/or retrieve or access a graph for compression.

In certain embodiments, the graph comprises decision nodes and intermediate nodes within node sets and edges connecting various nodes within edge sets. As will be recognized, each edge may be associated with a weighting value for traversing to a connecting node by way of the corresponding edge. Additionally, each node (e.g., location) may be associated with metadata or other descriptive data, such as latitude and longitude, signage, intersection points, crosswalks, traffic lights, and/or the like. Similarly, each edge (e.g., road segment) may be associated with metadata or other descriptive data, such as speed limits, height and weight limits, type of road (e.g., primary, secondary, residential), directionality, name, and/or the like. To facilitate the compression of the graph, the compression/decompression and routing system 115 may include pre-processing to generate a list, table, or other auxiliary information/data structure that is associated with each node and/or edge in the graph and include attributes of the nodes and edges. These generated auxiliary information/data structures may be stored by graph database 108 and/or in other storage mediums.

As indicated in step/operation 402 of FIG. 4, to begin the compression, the compression and routing system 115 identifies an intermediate node from the node set. Then, at step/operation 403, the compression/decompression and routing system 115 searches outwardly in both directions from the intermediate node to identify the first decision node in each direction. For example, in FIG. 3B, if the intermediate node under consideration were intermediate node 306, the compression/decompression and routing system 115 searches outwardly and identifies decision node 305 and decision node 307. Similarly, in FIG. 3B, if the intermediate node under consideration were intermediate node 308, the compression/decompression and routing system 115 searches outwardly and identifies decision node 307 and decision node 309. And finally, in FIG. 3B, if the intermediate node under consideration were intermediate node 302 or intermediate node 303, the compression/decompression and routing system 115 searches outwardly and identifies decision node 301 and decision node 304.

At step/operation 404, the compression/decompression and routing system 115 generates a new edge that bypasses the intermediate nodes. The compression/decompression and routing system 115 also generates a new weighting value for each new edge (step/operation 405). In some embodiments, the new weighting values may be the aggregate of the underlying edges associated with the intermediate nodes. For example, in FIG. 3C, if the intermediate node under consideration were intermediate node 306, the compression/decompression and routing system 115 generates a new edge 305/307 that extends from decision node 305 to decision node 307. Similarly, in FIG. 3C, if the intermediate node under consideration were intermediate node 308, the compression/decompression and routing system 115 generates a new edge 307/309 that extends from decision node 307 to decision node 309. And finally, in FIG. 3C, if the intermediate node under consideration were intermediate node 302 or intermediate node 303, the compression/decompression and routing system 115 generates a new edge 301/304 that extends from decision node 301 to decision node 304. And as noted, the weighting value for edge 301/304 is 5, which is the aggregate of the underlying edges. The weighting value for edge 307/309 is 3, which is the aggregate of the underlying edges. And the weighting value for edge 305/307 is 4, which is the aggregate of the underlying edges.

As step/operation 406, for each new edge, the compression/decompression and routing system 115 also stores the underlying intermediate node and edge data, such as the names, attributes, and weighting values. It also stores where it fits in the new compressed view. For example, edge 301/304 stores the underlying information/data for intermediate nodes 302 and 303 and their respective edges. Edge 305/307 stores the underlying information/data for intermediate node 308 and its edges. And edge 304/307 stores the underlying information/data for intermediate node 306 and its edges.

At steps/operations 407 and 408, the compression/decompression and routing system 115 iteratively repeats these steps/operations for all intermediate nodes in the graph, which results in a compressed graph. As a result, the new "view" of the compressed graph for routing only comprises decision nodes. In some embodiments, the new view may be a layer in a map.

As will be recognized, by having a graph with only decision nodes, the compression/decompression and routing system 115 considers significantly few nodes in routing determinations, which results in various computational efficiencies and requires less resource-intensive abilities. This compression may reduce graphs by 75% or more.

C. Exemplary Routing and Decompression Process

Once compressed, as indicated at step/operation 601 of FIG. 6, the compressed graph may be used for routing. To do so, the compression/decompression and routing system 115 can determine whether the start point or end point are in a node that is an intermediate node, e.g., a node that has been compressed (step/operation 602).

Responsive to a determination that neither the start node nor the end node is an intermediate node in the compressed graph, the compression/decompression and routing system 115 can determine the route from the start node to the end node using the compressed graph (step/operation 603). With the route determined, the compression/decompression and routing system 115 can decompress any new edges that are part of the determined route from the start node to the end node (step/operation 604). As will be recognized, for decompression, the compression/decompression and routing system 115 can access the information/data associated with any new edges that are traversed for the route. This allows the information/data for any intermediate nodes traversed to be accessed to provide the granular detail about the intermediate nodes. Then, the compression/decompression and routing system 115 can provide the decompressed route with the information/data for each decision node and each intermediate node traversed on the route (step/operation 605).

Responsive to a determination that at least one of the start node or the end node is an intermediate node in the compressed graph, the compression/decompression and routing system 115 can decompress the relevant portions of the graph before routing (step/operation 606). In particular, the compression/decompression and routing system 115 decompresses the parent compressed edge that the start/end node(s) fall under. For example, FIG. 5 shows the start node as intermediate node 302 and the end node as decision node 309. Thus at step/operation 606, the compression/decompression and routing system 115 determines that the start node is an intermediate node stored in edge 301/304. Therefore, before determining the route from the start node to the end node, the compression/decompression and routing system 115 first decompresses the edge 301/304 storing the information/data associated with intermediate node 302, and therefore intermediate node 303. This decompresses edge 301/304 and the information/data about each of intermediate nodes 302, 303 and their respective edges and weighting values.

With the portion of the compressed graph containing intermediate nodes 302, 303 decompressed, the compression/decompression and routing system 115 can determine the most efficient route from the start node (intermediate node 302) to the end node (decision node 309). To do so, the compression/decompression and routing system 115 can determine to the costs for each available route permutation. In this example, the compression/decompression and routing system 115 can determine that most efficient route from intermediate node 302 traverses nodes 302, 303, 304, 310, 307, and 309. The total weighting for this route is 9. In this example, because the start node has already been decompressed, the only compressed portion traversed by the determined route is edge 307/309. Thus, the compression/decompression and routing system 115 can decompress this portion of the route. For decompression, the compression/decompression and routing system 115 can access the information/data associated with edge 307/309. This allows the information/data for the intermediate nodes traversed to be accessed to provide the granular detail about the intermediate nodes. Then, the compression/decompression and routing system 115 can provide the decompressed route with the information/data for each decision node and each intermediate node traversed on the route (step/operation 605), such as an edge sequence so that the path can be traced through the graph.

C. Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for graph compression and routing, the apparatus comprising at least one processor and at least one memory including computer program code, the at least one memory and the computer program code configured to, with the at least one processor, cause the apparatus to:
   access a graph for compression, the graph comprising a node set comprising a plurality of nodes and an edge set comprising a plurality of edges, each edge of the plurality of edges comprising a corresponding weighting value;
   identify an intermediate node from the node set;
   programmatically (a) identify a first decision node from the plurality of nodes in a first direction, and (b) identify a second decision node from the plurality of nodes in a second direction, wherein the graph defines a path from the first decision node to the second decision node that passes through the intermediate node;
   generate a new edge from the first decision node to the second decision node, wherein the new edge bypasses at least the intermediate node;
   associate a new weighting value to the new edge; and
   update the graph with the new edge and the new weighting value for the new edge as a compressed graph.

2. The apparatus of claim 1, wherein the at least one memory and the computer program code are further configured to, with the at least one processor, cause the apparatus to:
   store data for the intermediate node in the new edge.

3. The apparatus of claim 2, wherein the at least one memory and the computer program code are further configured to, with the at least one processor, cause the apparatus to:
   determine a route from a third decision node to a fourth decision node using the compressed graph, wherein the route traverses the new edge.

4. The apparatus of claim 2, wherein the at least one memory and the computer program code are further configured to, with the at least one processor, cause the apparatus to:
   decompress the new edge to obtain the data associated with the intermediate node.

5. The apparatus of claim 1, wherein the graph represents a road network.

6. The apparatus of claim 2, wherein the at least one memory and the computer program code are further configured to, with the at least one processor, cause the apparatus to:
   provide the route for display, wherein the route comprises at least a portion of the data associated with the intermediate node, but not the new edge.

7. A computer-implemented method for graph compression and routing, the method comprising:
   accessing a graph for compression, the graph comprising a node set comprising a plurality of nodes and an edge set comprising a plurality of edges, each edge of the plurality of edges comprising a corresponding weighting value;
   identifying an intermediate node from the node set;
   programmatically (a) identifying a first decision node from the plurality of nodes in a first direction, and (b) identifying a second decision node from the plurality of nodes in a second direction, wherein the graph defines a path from the first decision node to the second decision node that passes through the intermediate node;
   generating a new edge from the first decision node to the second decision node, wherein the new edge bypasses at least the intermediate node;
   associating a new weighting value to the new edge; and
   updating the graph with the new edge and the new weighting value for the new edge as a compressed graph.

8. The computer-implemented of claim 7 further comprising:
   storing data for the intermediate node in the new edge.

9. The computer-implemented of claim 8 further comprising:

determining a route from a third decision node to a fourth decision node using the compressed graph, wherein the route traverses the new edge.

10. The computer-implemented of claim 8 further comprising:
decompressing the new edge to obtain the data associated with the intermediate node.

11. The computer-implemented of claim 7 further comprising:
providing the route for display, wherein the route comprises at least a portion of the data associated with the intermediate node, but not the new edge.

12. The computer-implemented of claim 7, wherein the graph represents a road network.

13. A computer program product comprising a non-transitory computer readable medium having computer program instructions stored therein, the computer program instructions when executed by a processor, cause the processor to:
access a graph for compression, the graph comprising a node set comprising a plurality of nodes and an edge set comprising a plurality of edges, each edge of the plurality of edges comprising a corresponding weighting value;
identify an intermediate node from the node set;
programmatically (a) identify a first decision node from the plurality of nodes in a first direction, and (b) identify a second decision node from the plurality of nodes in a second direction, wherein the graph defines a path from the first decision node to the second decision node that passes through the intermediate node;
generate a new edge from the first decision node to the second decision node, wherein the new edge bypasses at least the intermediate node;
associate a new weighting value to the new edge; and
update the graph with the new edge and the new weighting value for the new edge as a compressed graph.

14. The computer program product of claim 13, wherein the computer program instructions when executed by a processor, further cause the processor to:
store data for the intermediate node in the new edge.

15. The computer program product of claim 14, wherein the computer program instructions when executed by a processor, further cause the processor to:
determine a route from a third decision node to a fourth decision node using the compressed graph, wherein the route traverses the new edge.

16. The computer program product of claim 13, wherein the computer program instructions when executed by a processor, further cause the processor to:
decompress the new edge to obtain the data associated with the intermediate node.

17. The computer program product of claim 13, wherein the computer program instructions when executed by a processor, further cause the processor to:
provide the route for display, wherein the route comprises at least a portion of the data associated with the intermediate node, but not the new edge.

18. The computer program product of claim 13, wherein the graph represents a road network.

\* \* \* \* \*

UNITED STATES PATENT AND TRADEMARK OFFICE
CERTIFICATE OF CORRECTION

PATENT NO. : 11,630,806 B1  
APPLICATION NO. : 17/302157  
DATED : April 18, 2023  
INVENTOR(S) : Justin Timmons Page 1 of 1

It is certified that error appears in the above-identified patent and that said Letters Patent is hereby corrected as shown below:

In the Claims

In Column 16, Line 63, Claim 8, delete "computer-implemented" and insert -- computer-implemented method --, therefor.

In Column 16, Line 66, Claim 9, delete "computer-implemented" and insert -- computer-implemented method --, therefor.

In Column 17, Line 4, Claim 10, delete "computer-implemented" and insert -- computer-implemented method --, therefor.

In Column 17, Line 8, Claim 11, delete "computer-implemented" and insert -- computer-implemented method --, therefor.

In Column 17, Line 13, Claim 12, delete "computer-implemented" and insert -- computer-implemented method --, therefor.

Signed and Sealed this  
Thirteenth Day of June, 2023

Katherine Kelly Vidal  
*Director of the United States Patent and Trademark Office*